United States Patent
Cook

(10) Patent No.: US 10,430,926 B1
(45) Date of Patent: Oct. 1, 2019

(54) SYSTEMS, MEDIA, AND METHODS FOR IMPROVING RESPONSIVENESS OF SPOTLIGHT TOURS IN A DYNAMIC VIEWPORT ENVIRONMENT

(71) Applicant: PROMONTECH LLC, Denver, CO (US)

(72) Inventor: Dallas Cook, Westminster, CO (US)

(73) Assignee: PROMONTECH LLC, Denver, CO (US)

( * ) Notice: Subject to any disclaimer, the term of this patent is extended or adjusted under 35 U.S.C. 154(b) by 0 days.

(21) Appl. No.: 15/722,922

(22) Filed: Oct. 2, 2017

Related U.S. Application Data

(60) Provisional application No. 62/503,728, filed on May 9, 2017.

(51) Int. Cl.
*G06T 3/40* (2006.01)
*G06F 17/22* (2006.01)
*G06F 17/21* (2006.01)

(52) U.S. Cl.
CPC .......... *G06T 3/4092* (2013.01); *G06F 17/212* (2013.01); *G06F 17/2247* (2013.01); *G06T 2200/16* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 5,831,615 A | 11/1998 | Drews et al. | |
| 7,509,592 B1 | 3/2009 | Martinez | |
| 9,495,332 B2 * | 11/2016 | Abuelsaad | G06F 17/211 |
| 9,755,842 B2 * | 9/2017 | Raleigh | H04L 12/14 |
| 9,811,350 B2 * | 11/2017 | Steinberg | G06F 9/4443 |
| 2011/0246880 A1 * | 10/2011 | Horton | G06F 9/4446 715/708 |
| 2012/0115122 A1 * | 5/2012 | Bruce | G09B 7/00 434/323 |
| 2012/0331506 A1 * | 12/2012 | Arriola | G06F 17/30029 725/46 |
| 2014/0074971 A1 * | 3/2014 | Zhang | H04L 67/02 709/217 |
| 2014/0173474 A1 * | 6/2014 | Klemenz | G06F 3/0481 715/765 |
| 2014/0249912 A1 * | 9/2014 | Znerold | G06Q 30/0242 705/14.41 |
| 2014/0356844 A1 * | 12/2014 | Bharadwaj | G06F 17/241 434/362 |
| 2014/0365888 A1 * | 12/2014 | Curzon | G06F 3/0485 715/716 |
| 2015/0205884 A1 * | 7/2015 | Leventhal | G06F 17/2247 715/234 |

(Continued)

OTHER PUBLICATIONS

Maristela Salvatore et al., Add interactive documentation to your JavaScript apps with Intro.js, IBM developer Works, Published: Oct. 9, 2015; pp. 1-13 (Year: 2015).*

(Continued)

*Primary Examiner* — Howard Cortes
(74) *Attorney, Agent, or Firm* — Wilson Sonsini Goodrich & Rosati

(57) ABSTRACT

Described are methods, systems, and media for improving the responsiveness and efficiency of a spotlight tour in an environment with a dynamic viewport and bandwidth constraints.

30 Claims, 8 Drawing Sheets

(56) References Cited

U.S. PATENT DOCUMENTS

| | | | |
|---|---|---|---|
| 2015/0277727 A1* | 10/2015 | Jemiolo | ............... G06F 17/241 715/704 |
| 2017/0235582 A1* | 8/2017 | Ramirez | ............... G06F 9/4446 715/708 |
| 2017/0277378 A1* | 9/2017 | Rajabi | ................... G06F 3/0485 |
| 2017/0344895 A1* | 11/2017 | Roy | ....................... G06N 7/005 |

OTHER PUBLICATIONS

Amelia Bellamy-Royds; How to Scale SVG; CSS-Tricks; Published: Jan. 6, 2015, pp. 1-26 (Year: 2015).*
Maria Antonietta Perna; Masking in the Browser with CSS and SVG; SitePoint; Published: May 10, 2016; pp. 1-18 (Year: 2016).*
GitHub, Usablica/intro.js "ResponsiveBehaviour" Comment dated Nov. 8, 2016 pp. 1-2 (Year: 2016).*
Ashing Mehrabani et al, Instant IntroJS; Packt Publishing, Published: Sep. 25, 2013 pp. 1-25 (Year: 2013).*
Nick Babich, Mobile Onboarding: Interact, Don't Tell, UX planet, Published: Mar. 8, 2016 pp. 1-9 (Year: 2016).*
Afshinm, Usablica/Intro.js, GitHub, Published: Mar. 25, 2014. Retrieved: https://github.com/usablica/intro.js/blob/master/example/programmatic/index.html (Year: 2014).*
Hopscotch, Archived: Mar. 1, 2014 Retrieved: https://web.archive.org/web/20140301090235/http://linkedin.github.io/hopscotch/ (Year: 2014).*
Harley. Instructional Overlays and Coach Marks for Mobile Apps. Nielsen Norman Group. Available at https://www.nngroup.com/articles/mobile-instructional-overlay/ (9 pgs.) (Feb. 16, 2014).

* cited by examiner

```
     Tour Object
+ id: string
+ controls: Controls
+ layout: string
+ type: string
+ element: Element
```

```
 1  {
 2      "id" : "spotlightSidebar",
 3      "controls" : {
 4          "desktop" : "top-right",
 5          "mobile" : "above"
 6      },
 7      "layout" : "sidebar",
 8      "type" : "circle",
 9      "element" : {}
10  }
```

```
   Controls Object
+ desktop: string
+ mobile: string
```

```
1  {
2      "layout" : "body",
3      "controls" : {
4          "desktop" : "center",
5          "mobile" : "center"
6      }
7  }
```

FIG. 2D

SYSTEMS, MEDIA, AND METHODS FOR IMPROVING RESPONSIVENESS OF SPOTLIGHT TOURS IN A DYNAMIC VIEWPORT ENVIRONMENT

CROSS-REFERENCE TO RELATED APPLICATIONS

This application claims the benefit of U.S. Application Ser. No. 62/503,728, filed May 9, 2017, the entire contents of which are hereby incorporated by reference.

BACKGROUND OF THE INVENTION

The variety of computing devices used to access web applications and mobile applications grows every day and this growth is accelerating. Today, users access content, features, and functionality of such application via, for example, desktops, laptops, netbooks, tablets, smartphones, watches, vehicles, televisions, and other appliances. Each device in this diverse pool has a different display screen size. Moreover, increasingly, mobile devices alter their display parameters when the orientation of the device is changed. Additionally, while broadband network access is proliferating in residential and commercial facilities, the ubiquity of smartphones and other devices that can utilize cellular data to enable web applications and mobile applications outside of these broadband environments has created a new constraint on bandwidth.

SUMMARY OF THE INVENTION

Web applications and mobile applications allow users to access increasingly important and complex functions. As these applications grow in importance and complexity, providers must be ever more mindful of usability and user experience. Spotlight tours can be an effective way to provide information about the features offered by an application and guide users. However, the plethora of display screen sizes, the fact that display parameters can change with viewport resize, and the bandwidth constraints of cellular networks create challenges that can destroy the usability and usefulness of spotlight tours.

The methods, systems, and media described herein change the traditional paradigm for functionality for application spotlight tours. First, by dynamically configuring the tour parameters based not only on the application content and the tour content, but also the real-time configuration of the user's viewport, the subject matter described herein can adapt to any display screen size. Second, by listening for any changes to the viewport during the tour, the subject matter described herein re-configures the tour on-the-fly to further adapt to device reorientation and user adjustments to their browser window size or aspect ratio. Third, by using Scalable Vector Graphics (SVG), the subject matter described herein can present an effective and efficient spotlight tour in a bandwidth constrained environment, such as a mobile device using a cellular network to access the application and tour.

In one aspect, disclosed herein are computer-implemented methods of improving the responsiveness of a spotlight tour in a dynamic viewport environment comprising: a) maintaining, in a computer storage, configuration data for the spotlight tour, the configuration data comprising a plurality of spotlight tour navigation steps, each navigation step associated with a spotlight tour object, a shape property, and tour controls data; b) drawing, by a computer, an SVG clip element and associated mask element for the current navigation step based on the current viewport size and shape property; c) positioning, by the computer, the SVG clip element and associated mask element based on offset coordinates calculated from the spotlight tour object; d) rendering, by the computer, tour controls for the navigation step based on the viewport size; e) positioning, by the computer, the tour controls based on offset coordinates calculated from the tour controls data; and f) initializing, by the computer, a resize listener for the viewport, wherein the resize listener, upon resize of the viewport, re-executes steps b)-e). In some embodiments, the computer storage is a local file. In other embodiments, the computer storage is a local database. In yet other embodiments, the computer storage is an external database. In some embodiments, the configuration data comprises an array of spotlight tour objects and navigation steps. In some embodiments, the viewport is a browser window. In other embodiments, the viewport is a mobile native interface. In some embodiments, the method further comprises rendering an SVG clip and mask for each spotlight tour object at full viewport size prior to drawing and positioning the clip and mask. In some embodiments, each navigation step is further associated with tour copy and wherein the method further comprises positioning the tour copy based on offset coordinates calculated from the spotlight tour object.

In another aspect, disclosed herein are computer-implemented systems comprising: a digital processing device comprising: a) at least one processor, an operating system configured to perform executable instructions, a memory, and a computer program including instructions executable by the digital processing device to create a spotlight tour application comprising: configuration data, in an computer storage, for the spotlight tour, the configuration data comprising a plurality of spotlight tour navigation steps, each navigation step associated with a spotlight tour object, a shape property, and tour controls data; b) a software module drawing an SVG clip element and associated mask element for the current navigation step based on the current viewport size and shape property; c) a software module positioning the SVG clip element and associated mask element based on offset coordinates calculated from the spotlight tour object; d) a software module rendering tour controls for the navigation step based on the viewport size; e) a software module positioning the tour controls based on offset coordinates calculated from the tour controls data; and f) a software module initializing a resize listener for the viewport, wherein the resize listener, upon resize of the viewport, re-executes steps b)-e). In some embodiments, the computer storage is a local file. In other embodiments, the computer storage is a local database. In yet other embodiments, the computer storage is an external database. In some embodiments, the configuration data comprises an array of spotlight tour objects and navigation steps. In some embodiments, the viewport is a browser window. In other embodiments, the viewport is a mobile native interface. In some embodiments, the system further comprises a software module rendering an SVG clip and mask for each spotlight tour object at full viewport size prior to drawing and positioning the clip and mask. In some embodiments, each navigation step is further associated with tour copy and wherein the wherein the spotlight tour application further comprises a software module positioning the tour copy based on offset coordinates calculated from the spotlight tour object.

In yet another aspect, disclosed herein are non-transitory computer-readable storage media encoded with a computer program including instructions executable by a processor to create a spotlight tour application comprising: a) configuration data, in an computer storage, for the spotlight tour, the configuration data comprising a plurality of spotlight tour navigation steps, each navigation step associated with a spotlight tour object, a shape property, and tour controls data; b) a software module drawing an SVG clip element and associated mask element for the current navigation step based on the current viewport size and shape property; c) a software module positioning the SVG clip element and associated mask element based on offset coordinates calculated from the spotlight tour object; d) a software module rendering tour controls for the navigation step based on the viewport size; e) a software module positioning the tour controls based on offset coordinates calculated from the tour controls data; and f) a software module initializing a resize listener for the viewport, wherein the resize listener, upon resize of the viewport, re-executes steps b)-e). In some embodiments, the computer storage is a local file. In other embodiments, the computer storage is a local database. In yet other embodiments, the computer storage is an external database. In some embodiments, the configuration data comprises an array of spotlight tour objects and navigation steps. In some embodiments, the viewport is a browser window. In other embodiments, the viewport is a mobile native interface. In some embodiments, the system further comprises a software module rendering an SVG clip and mask for each spotlight tour object at full viewport size prior to drawing and positioning the clip and mask. In some embodiments, each navigation step is further associated with tour copy and wherein the spotlight tour application further comprises a software module positioning the tour copy based on offset coordinates calculated from the spotlight tour object.

BRIEF DESCRIPTION OF THE DRAWINGS

A better understanding of the features and advantages of the present invention will be obtained by reference to the following detailed description that sets forth illustrative embodiments and the accompanying drawings of which:

Figure 1A:
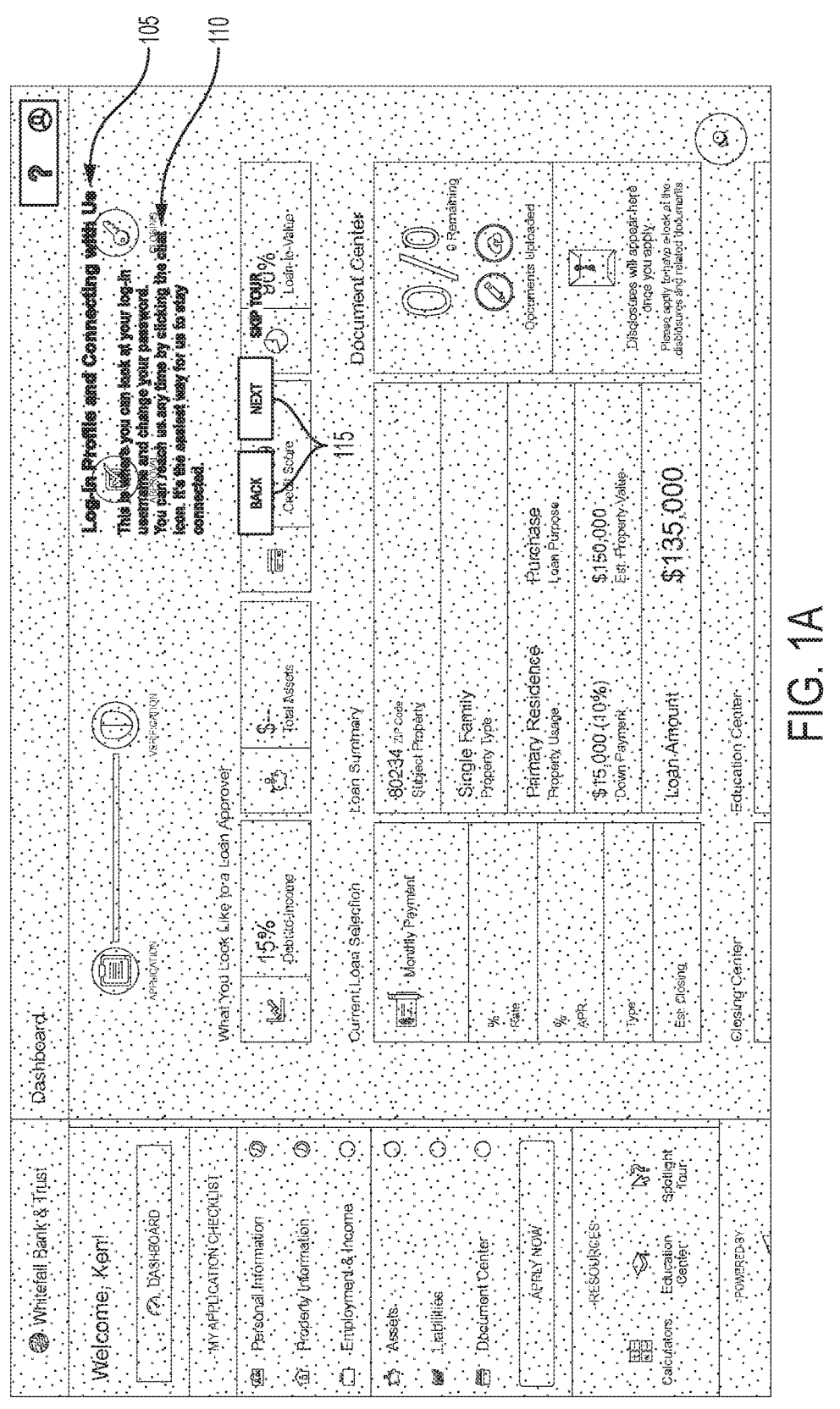

FIG. 1A shows non-limiting exemplary screenshot of spotlight tour on a desktop size screen;

FIG. 2A shows a non-limiting exemplary UML object diagram of a spotlight tour objects;

FIG. 2B shows a non-limiting exemplary language file for a tour object for a spotlight sidebar;

FIG. 2C shows a non-limiting exemplary UML object diagram of a spotlight tour controls object;

FIG. 2D shows a non-limiting exemplary language file for a spotlight tour controls object;

DETAILED DESCRIPTION OF THE INVENTION

Figure 1B:
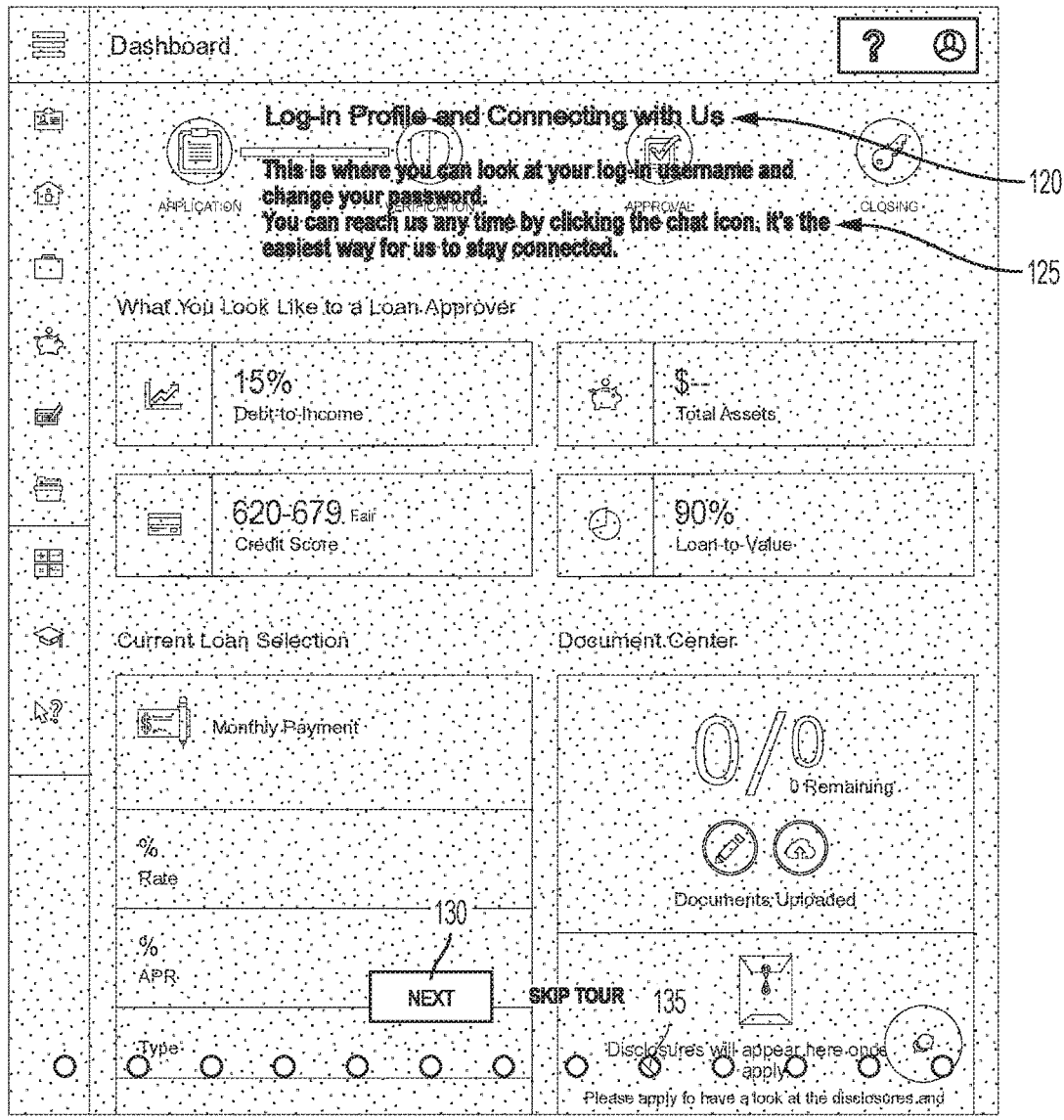
FIG. 1B shows non-limiting exemplary screenshot of spotlight tour on a tablet size screen.

Described herein, in certain embodiments, are computer-implemented methods of improving the responsiveness of a spotlight tour in a dynamic viewport environment comprising: a) maintaining, in a computer storage, configuration data for the spotlight tour, the configuration data comprising a plurality of spotlight tour navigation steps, each navigation step associated with a spotlight tour object, a shape property, and tour controls data; b) drawing, by a computer, an SVG clip element and associated mask element for the current navigation step based on the current viewport size and shape property; c) positioning, by the computer, the SVG clip element and associated mask element based on offset coordinates calculated from the spotlight tour object; d) rendering, by the computer, tour controls for the navigation step based on the viewport size; e) positioning, by the computer, the tour controls based on offset coordinates calculated from the tour controls data; and f) initializing, by the computer, a resize listener for the viewport, wherein the resize listener, upon resize of the viewport, re-executes steps b)-e).

Also described herein, in certain embodiments, are computer-implemented systems comprising: a digital processing device comprising: a) at least one processor, an operating system configured to perform executable instructions, a memory, and a computer program including instructions executable by the digital processing device to create a spotlight tour application comprising: configuration data, in an computer storage, for the spotlight tour, the configuration data comprising a plurality of spotlight tour navigation steps, each navigation step associated with a spotlight tour object, a shape property, and tour controls data; b) a software module drawing an SVG clip element and associated mask element for the current navigation step based on the current viewport size and shape property; c) a software module positioning the SVG clip element and associated mask element based on offset coordinates calculated from the spotlight tour object; d) a software module rendering tour controls for the navigation step based on the viewport size; e) a software module positioning the tour controls based on offset coordinates calculated from the tour controls data; and f) a software module initializing a resize listener for the viewport, wherein the resize listener, upon resize of the viewport, re-executes steps b)-e).

Also described herein, in certain embodiments, are non-transitory computer-readable storage media encoded with a computer program including instructions executable by a processor to create a spotlight tour application comprising: a) configuration data, in an computer storage, for the spotlight tour, the configuration data comprising a plurality of spotlight tour navigation steps, each navigation step associated with a spotlight tour object, a shape property, and tour controls data; b) a software module drawing an SVG clip element and associated mask element for the current navigation step based on the current viewport size and shape property; c) a software module positioning the SVG clip element and associated mask element based on offset coordinates calculated from the spotlight tour object; d) a software module rendering tour controls for the navigation step based on the viewport size; e) a software module positioning the tour controls based on offset coordinates calculated from the tour controls data; and f) a software module initializing a resize listener for the viewport, wherein the resize listener, upon resize of the viewport, re-executes steps b)-e).

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, Scalable Vector Graphics, or SVG, refers to the XML-based vector image format for two-dimensional graphics, with support for interactivity and animation, for which the specification is an open standard developed by the World Wide Web Consortium (W3C). In light of the disclosure provided herein, those of ordinary skill the filed will recognize that SVG images and their behaviors are defined in XML text files and can be searched, indexed, scripted, and compressed. All major modern web browsers—including Mozilla Firefox, Internet Explorer, Google Chrome, Opera, Safari, and Microsoft Edge—have SVG rendering support.

Dynamic Loading

As the spotlight tour is agnostic of its data source, data to support the spotlight tour, comprising a collection of spotlight tour objects and accompanying language files, can be loaded from any source as long as it is valid JavaScript Object Notation (JSON). This allows a developer to define a collection within any file or database, whether it is on the same server as the web application or within an API that can be retrieved over a network. Once the data is provided to the spotlight tour, it is up to the configuration provided to properly render the spotlight tour steps.

Responsiveness

Figure 1C:
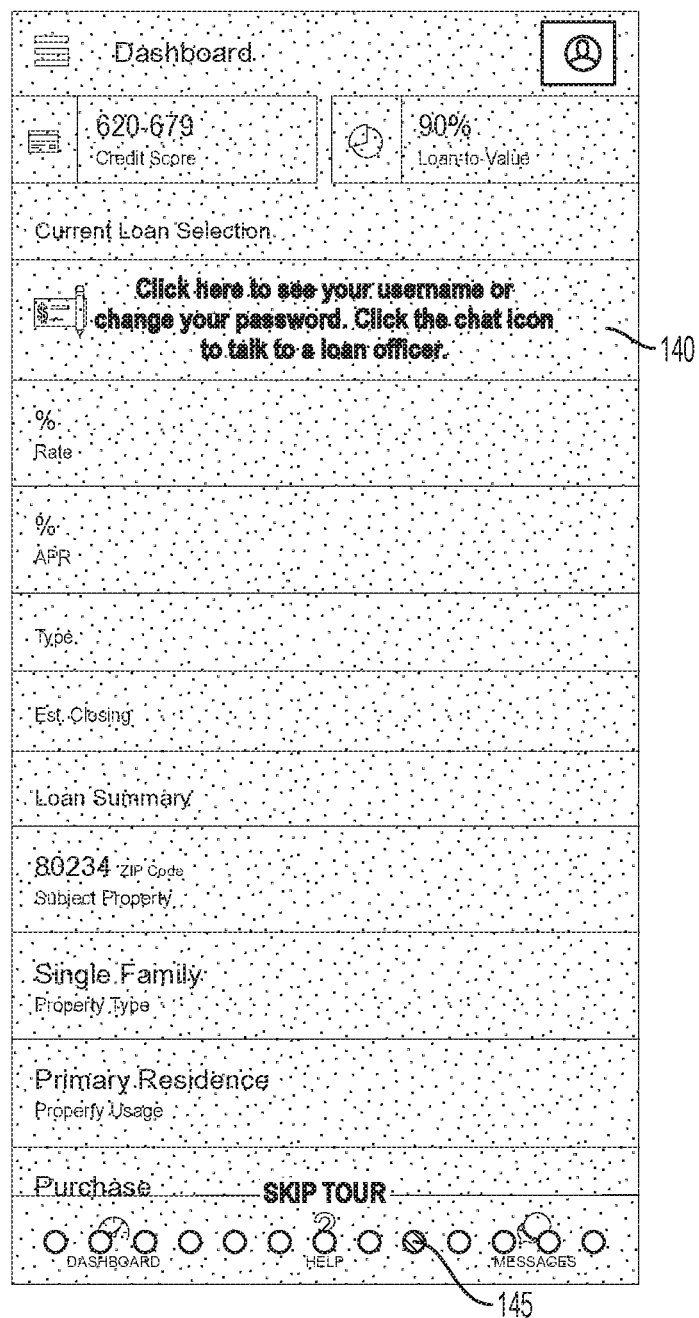
FIG. 1C shows non-limiting exemplary screenshot of spotlight tour on a mobile size screen.

A responsive web application can adapt to any screen size and can make use of the latest web technologies such as CSS media queries and JavaScript's ability to determine the viewport size from the global Window object. Responsive web applications allow web developers to deliver different content and markup depending on the screen size. An important feature of the dynamically loaded spotlight tour is its ability to render itself to fit any screen size. Depending on the screen size, the spotlight tour includes different features. In some embodiments, on mobile screen sizes, swipe capability and shorter snippets of content are delivered to the viewport. In some embodiments, on desktop screen sizes, larger blocks of text with headings are used, as well as larger buttons for navigation. When the tour initially loads within a viewport, it renders itself to fit to the current viewport, but in the event that user chooses to resize the viewport, the tour will re-render itself to fit the new viewport size. FIG. 1A shows the a screenshot of an example of the spotlight tour in 1200 pixel width desktop size screen that is transitioned to a 960 pixel width tablet size screen as shown in FIG. 1B and to a 400 pixel width mobile size screen as shown in FIG. 1C. In FIGS. 1A-1C, each example screenshot was captured in sequence without refreshing the viewport window. The example shows how the spotlight tour is able to redraw the SVG shape depending on the DOM element's own responsive size changes and the different control configurations, including actionable elements and text.

Tour Controls

In some embodiments, tour controls are the optional navigation buttons, descriptions, and header text that can be associated with each spotlight tour navigation step. In some embodiments, a tour controls object is used to maintain the position for mobile size, tablet size, and desktop size screens for each tour object, so that the tour controls are rendered in the correct positions within the viewport. In some embodiments, a tour controls object refers to tour controls data. In some embodiments, tour controls position options for desktop size screens are: top-left, top-right, bottom-left, bottom-right, top-center, center-left, center-right, bottom-center, center. In some embodiments, the tour controls position options are for mobile size screens: above, below, and center. Each of these tour controls position options include specific calculations for each of the top (x) and left (y) positions for the tour controls area relative to the tour element. Features within tour controls also differ depending on the viewport size. In some embodiments, on mobile size screens or tablet size screens, navigation buttons are rendered across the bottom of the screen providing a type of simple pagination. Swipe functionality is also enabled for navigation. In some embodiments, on desktop size screens, tour controls buttons are rendered within the tour controls area defined within the tour controls object. The tour controls buttons may include next, back, skip, and final navigational options depending on the navigation step. In other embodiments, both navigation buttons and tour controls buttons may be included on desktop size or tablet size screen. In some embodiments, tour controls include text which is also configurable depending on the screen size. In some embodiments, the title headers do not display on mobile size screen, and title headers display on desktop size screens and tablet size screens. FIG. 1A shows a spotlight tour with title header 105, text 110, and tour controls buttons 115 across top-right on a 1200 pixel width desktop size screen. FIG. 1B shows a spotlight tour with title header 120 and text 125 across the top-center, and tour controls buttons 130 and navigation buttons 135 across the bottom-center on a 960 pixel width tablet size screen. FIG. 1C shows a spotlight tour with text 140 across the top and navigation buttons 145 across the bottom of a 400 pixel width mobile size screen.

SVG Spotlight Shapes

Figure 1D:
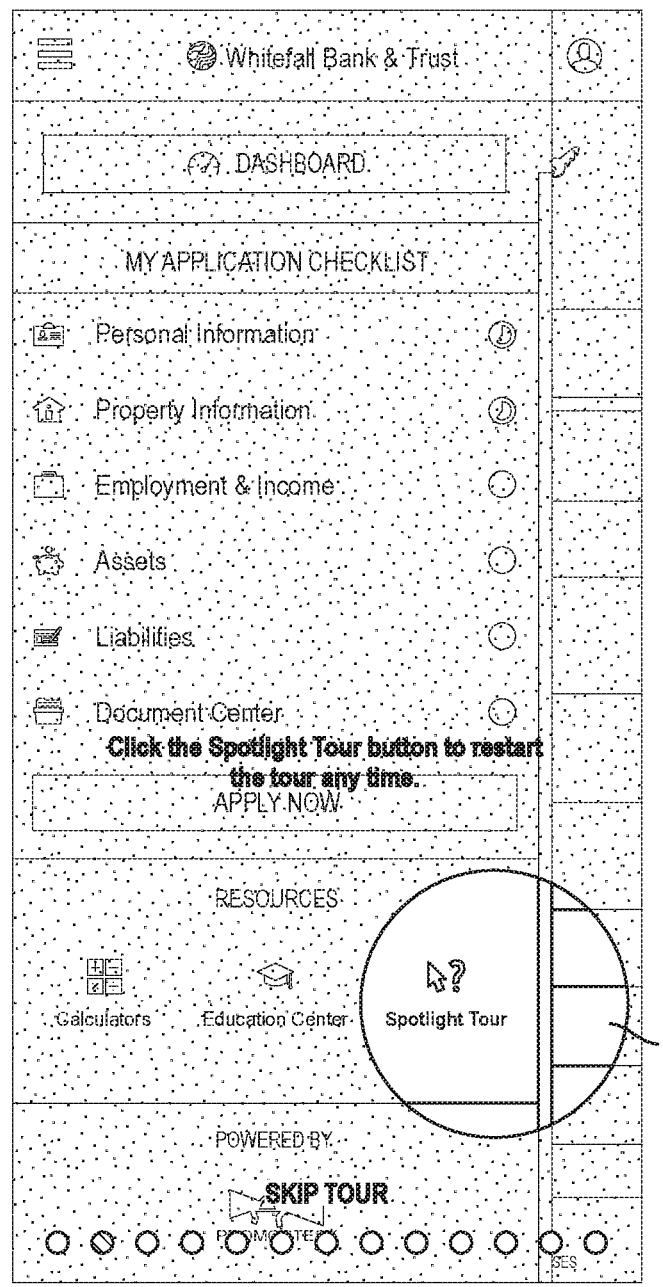
FIG. 1D shows a non-limiting exemplary screenshot of a circle spotlight shape in a spotlight tour on a mobile size screen.

In some embodiments, to render the transparent shapes, the spotlight tour uses SVG 1.1 specification and a unique implementation of masking and clipping techniques. In preferred embodiments, the following steps provide an overview of how the transparent spotlight tour effect is achieved. A mask element comprising a SVG rect element with coordinates of 0, 0 is defined as a reference. This mask element is to be later used as the masking shape. Another SVG shape element, also referred to as a SVG clip element, comprising a SVG rect element is defined outside of the reference block with the same coordinates and dimensions as the mask element. The mask attribute is utilized to create a reference to the mask element on the SVG clip element. An important aspect of this implementation is that a fill color of white is applied to the mask element. On instantiation of the spotlight tour, the mask and SVG clip elements are modified to fit to the full size of the viewport. This provides a "canvas" that encompasses all elements defined within the spotlight tour. When a tour element is calculated and appended to the mask element, the tour element is given a fill attribute of black. By combining the white fill attribute of the mask element with the black fill attribute of the appended tour element, a transparency effect is created over the spotlight tour object. This effect is created through a process called simple alpha blending compositing. This process blends the drawn element's color values into the container element's color values, (which in this case is the mask element) through a series of calculations defined within the SVG specification. When blended, the black fill value of the tour element combined with the white fill value of the mask element produces a fully transparent clip based on the alpha level calculated through the alpha compositing process. FIG. 1D shows an example of a circle spotlight shape 150 on a mobile size screen to highlight an area of the spotlight tour.

Spotlight Tour Object

In some embodiments, each navigation step in the spotlight tour can be represented by an object that contains specific information related to the various aspects of a spotlight tour navigation step as the spotlight tour is configurable. In some embodiments, the spotlight tour object contains information that identifies to the tour logic for the navigation step the position of the tour element in the application layout, the position to place the tour controls relative to the SVG spotlight shape, the shape of the SVG spotlight shape (i.e. circle, square), and whether or not the navigation step should include a SVG spotlight shape. The inclusion of the SVG spotlight shape within the navigation step is dependent upon the existence of an ID selector. FIG. 2A shows a UML object diagram of the types of parameters that may be included as spotlight tour objects. FIG. 2C shows a UML object diagram for controls object, which includes desktop and mobile.

In some embodiments, the collection of spotlight tour objects that make up the spotlight tour is also accompanied by a language file, which facilitates the ability of the spotlight tour to support multiple languages. In some embodiments, the language file contains a collection of language data that positionally matches the collection of spotlight tour objects and is mapped within the spotlight tour on initialization. The language file contains the text that is displayed within the area for control area of the navigation step. In some embodiments, the text may include a title and various contents that are specific for various viewport sizes. In preferred embodiments, the text includes a title, the description for desktop size screens, and a shorter description for tablet and mobile size screens. This language file enables the spotlight tour to deliver different content depending on the screen size being targeted, allowing for larger blocks of text on desktops and short snippets on tablets and mobile devices. The spotlight tour can be responsive to the viewport size and adjust the content according to the viewport size. FIG. 2B shows an example of a language file for a tour object for a spotlight sidebar. FIG. 2D shows an example of a language file for a controls object.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle®, Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 4:
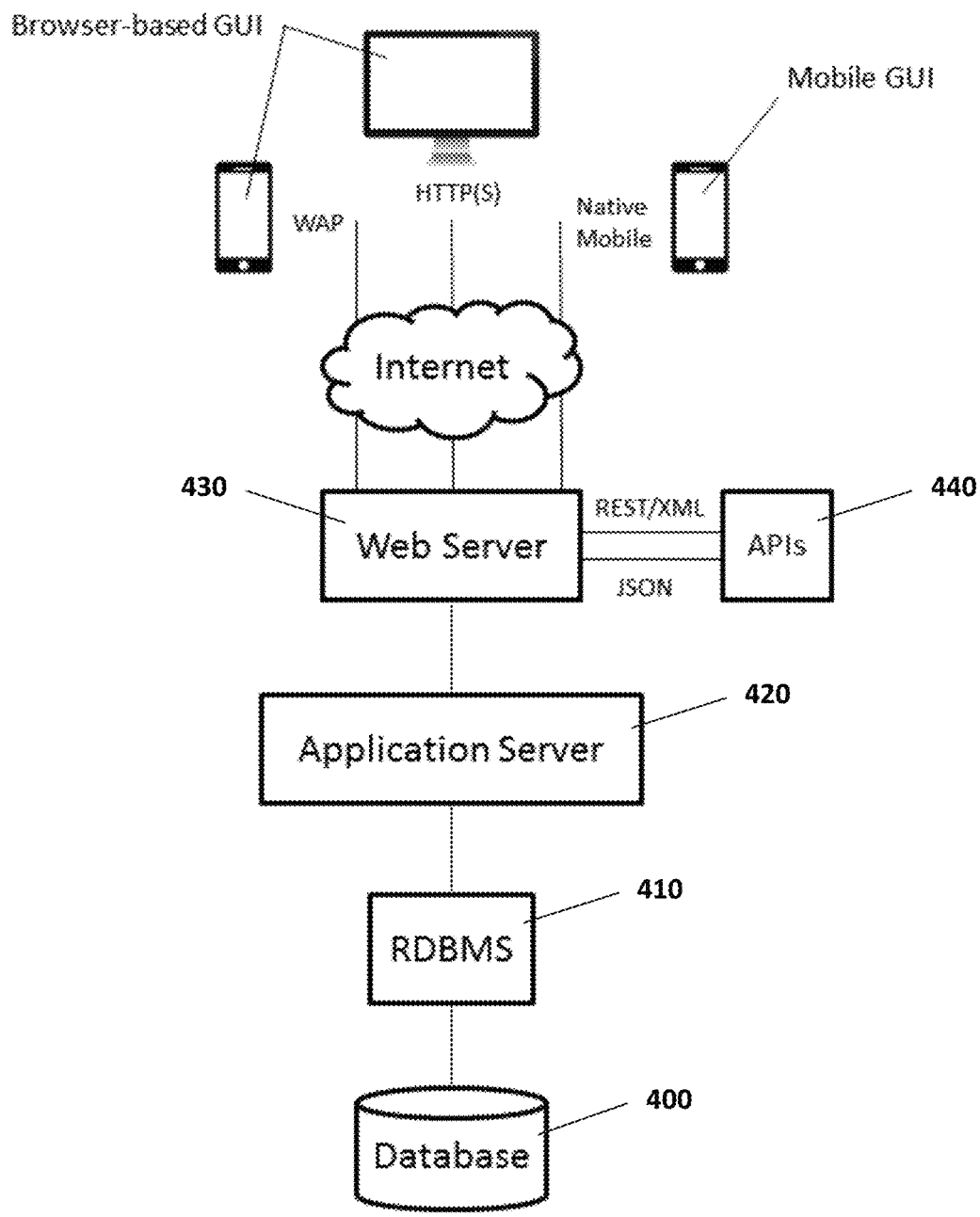
FIG. 4 shows a non-limiting exemplary schematic diagram of a web/mobile application provision system; in this case, a system providing browser-based and/or native mobile user interfaces.

Referring to FIG. 4, in a particular embodiment, an application provision system comprises one or more databases 400 accessed by a relational database management system (RDBMS) 410. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 420 (such as Java servers, .NET servers, PHP servers, and the like) and one or more web servers 430 (such as Apache, IIS, GWS and the like). The web server(s) optionally expose one or more web services via app application programming interfaces (APIs) 440. Via a network, such as the Internet, the system provides browser-based and/or mobile native user interfaces.

Figure 5:
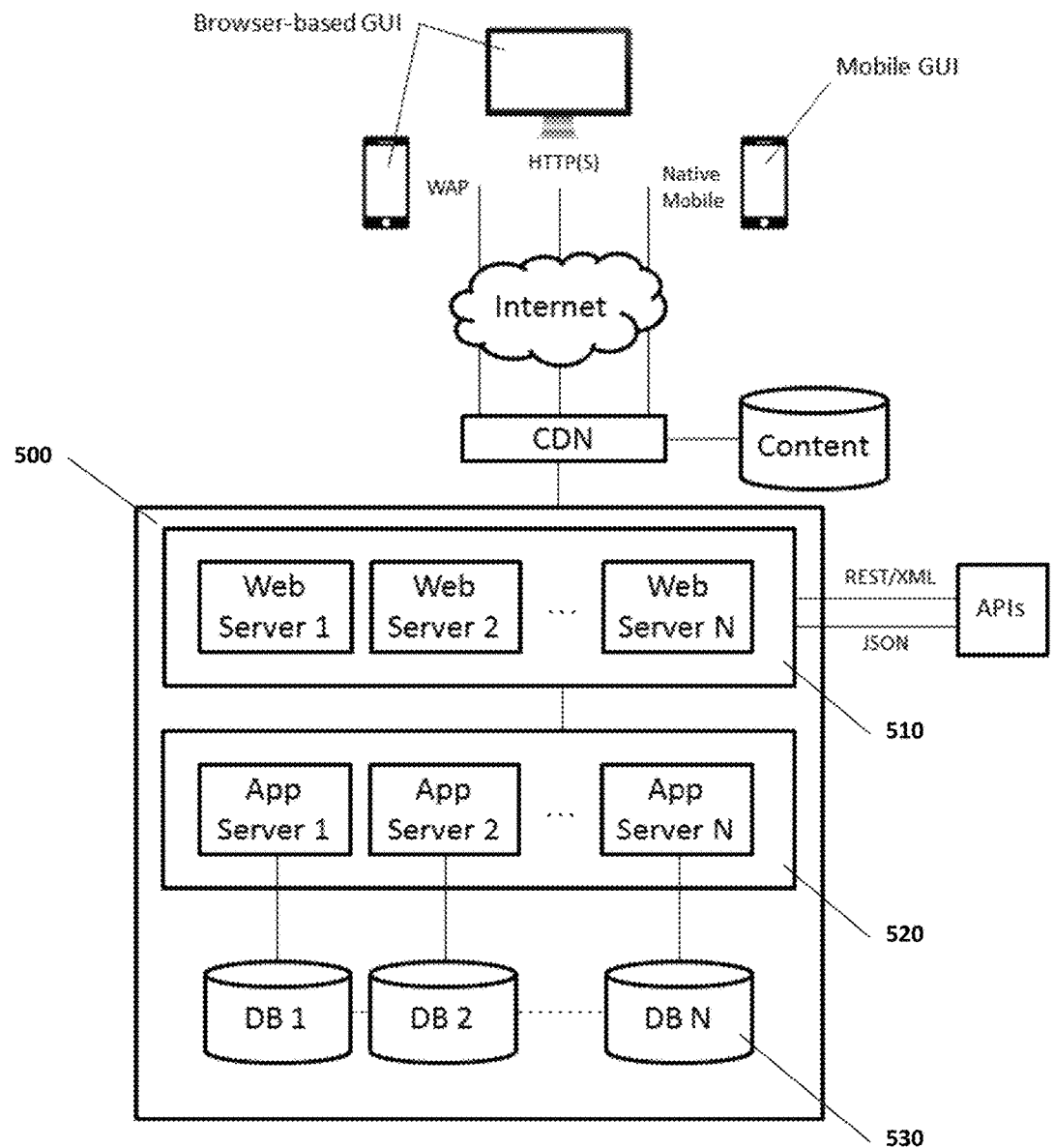
FIG. 5 shows a non-limiting exemplary schematic diagram of a cloud-based web/mobile application provision system; in this case, a system comprising an elastically load balanced, auto-scaling web server and application server resources as well synchronously replicated databases.

Referring to FIG. 5, in a particular embodiment, an application provision system alternatively has a distributed, cloud-based architecture 500 and comprises elastically load balanced, auto-scaling web server resources 510 and application server resources 520 as well synchronously replicated databases 530.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of spotlight tour configuration information such as spotlight tour navigation steps, spotlight tour objects, spotlight tour shape properties, and spotlight tour controls data. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1

Figure 3:
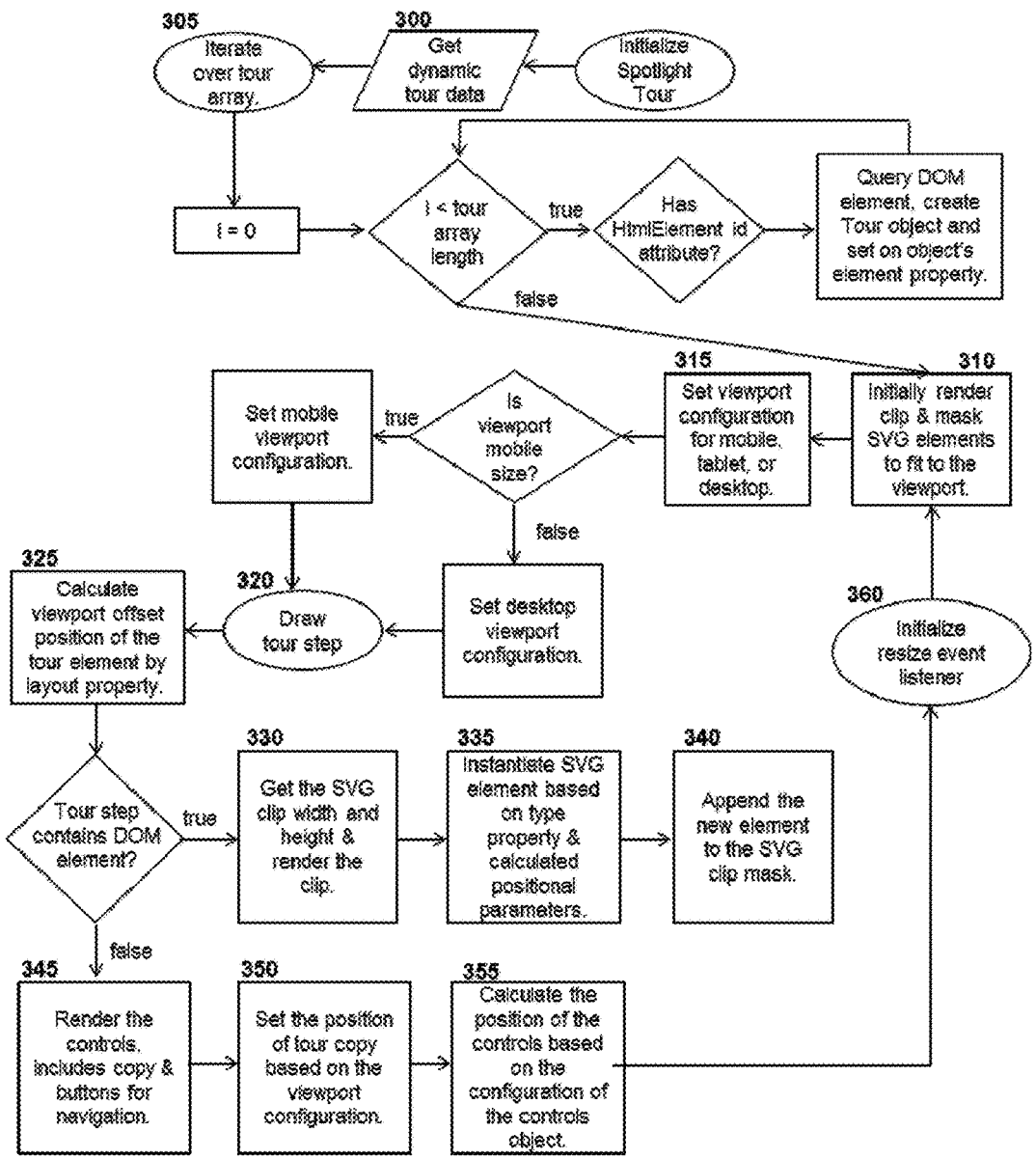
FIG. 3 shows a non-limiting exemplary flow diagram for a spotlight tour creation process; in this case, a spotlight tour creation process resulting in a spotlight tour that is scalable and dynamically responsive to changes in viewport configuration.

A spotlight tour of the features of a web application is configured and implemented as follows and as shown in FIG. 3. When rendering the spotlight tour, a series of logical steps is followed to complete the process and a subset of these steps is employed to re-render the tour if the viewport size changes.

In step 300, on initialization of the spotlight tour, a JSON data set is loaded from a data source such as a local JSON file or a database or an external API. The data contains a collection of spotlight tour objects including all the information needed to calculate and draw each navigation step of the tour along with the accompanying language files that store text and optional translations.

In step 305, if a collection of spotlight tour objects exists within the JSON data set, the collection is iterated over instantiating new spotlight tour objects on each iteration. If the object contains an "id" property, the DOM is queried for the provided selector and then assigned the HtmlElement object to the element property of the spotlight tour object. The element will be used later when calculating each navigation step on initialization and when a user navigates throughout the tour.

In step 310, the spotlight tour renders the SVG clip and mask elements to fill the viewport in order to provide a backdrop on which element clips will be later rendered.

In step 315, mobile or desktop configuration objects are set, depending on the pixel width of the viewport. These configuration objects are to be used later in calculating positional options for drawing the SVG clip and controls elements. In step 320, the spotlight tour then begins the calculations to draw the nth SVG clip element and controls depending on the currently set navigation step. Changes to the current navigation step occur as a result of user actions, such as clicking the controls buttons or swiping on a mobile or a tablet device. In step 325, provided an element identifier and the existence of the element within the DOM, the next method in the sequence calculates the offset coordinates of the tour element relative to its parent layout container. The layout property of the tour object contains the parent layout for each viewport size.

In step 330, the next step gets the height and width of the element, which are to be used later in the calculation for the placement of the tour controls, which include navigational elements and text, and then the tour logic proceeds with rendering the clip element on the backdrop SVG elements.

In step 335, if a DOM element is configured for the current tour step, a new SVG element is instantiated and configured based on the shape or type property defined within the tour object.

In step 340, after the SVG clip element object has been created, it is appended directly to the parent SVG clip element, which essentially draws a transparent shape around the DOM element.

In step 345, when the clip rendering step is complete or if no DOM element was defined in the current tour step, the controls for the tour step are rendered.

In step 350, based on the viewport configuration, the position and values of the tour text, including the title and description are set within the controls DOM element.

In step 355, the next step calculates the position of the navigational control elements. The calculation is based on the viewport configuration, clip element offset, clip element width and height, the control element width and height, and the viewport current width and height. The return of the calculation is then set as CSS styling on the controls DOM element.

In step 360, on completion of the previous steps, the tour logic initializes a resize listener. On the event of a screen resize, the resize listener re-executes steps 3-12, making the spotlight tour completely responsive within any screen's viewport size, even dynamically on user action.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented method of improving the responsiveness of a spotlight tour in a dynamic viewport environment comprising:
   a) maintaining, in a computer storage, configuration data for the spotlight tour, the configuration data comprising a plurality of spotlight tour navigation steps, each navigation step associated with a spotlight tour object, a shape property, and tour controls data;
   b) defining, by a computer, a mask element comprising an Scalable Vector Graphics (SVG) rect element with a fill color of white based on a current viewport size;
   c) drawing, by the computer, an SVG clip element with a fill color of black for the current navigation step based on the current viewport size, the shape property, and offset coordinates calculated from the spotlight tour object;

d) appending, by the computer, the SVG clip element to the mask element, wherein the SVG clip element is rendered as a transparent region in the mask by alpha blending compositing to create a spotlight effect over the spotlight tour object;

e) rendering, by the computer, tour controls for the navigation step based on the viewport size;

f) positioning, by the computer, the tour controls based on offset coordinates calculated from the tour controls data; and g) initializing, by the computer, a resize listener for the viewport, wherein the resize listener, upon resize of the viewport, removes and re-draws the mask element and the SVG clip element for the current navigation step by re-executing steps b)-e) without refreshing the viewport environment.

2. The method of claim 1, wherein the computer storage is a local file.

3. The method of claim 1, wherein the computer storage is a local database.

4. The method of claim 1, wherein the computer storage is an external database.

5. The method of claim 1, wherein the configuration data comprises an array of spotlight tour objects and navigation steps.

6. The method of claim 1, wherein the viewport is a browser window.

7. The method of claim 1, wherein the viewport is a mobile native interface.

8. The method of claim 1, wherein each navigation step is further associated with tour copy and wherein the method further comprises positioning the tour copy based on offset coordinates calculated from the spotlight tour object.

9. The method of claim 1, wherein the method further comprises instantiating, in a memory of the computer, the mask element comprising the SVG rect element at the full size of the viewport.

10. The method of claim 1, wherein the method further comprises re-executing steps b)-d) for each of the plurality of spotlight tour navigation steps.

11. A computer-implemented system comprising: a digital processing device comprising: at least one processor, an operating system configured to perform executable instructions, a memory, and a computer program including instructions, residing in the memory, executable by the digital processing device to create a spotlight tour application comprising:

a) configuration data, in an computer storage, for the spotlight tour, the configuration data comprising a plurality of spotlight tour navigation steps, each navigation step associated with a spotlight tour object, a shape property, and tour controls data;

b) a software module defining, by a computer, a mask element comprising an Scalable Vector Graphics (SVG) rect element with a fill color of white based on a current viewport size;

c) a software module drawing an SVG clip element with a fill color of black for the current navigation step based on the current viewport size, the shape property, and offset coordinates calculated from the spotlight tour object;

d) a software module appending the SVG clip element to the mask element, wherein the SVG clip element is rendered as a transparent region in the mask by alpha blending compositing to create a spotlight effect over the spotlight tour object;

e) a software module rendering tour controls for the navigation step based on the viewport size;

f) a software module positioning the tour controls based on offset coordinates calculated from the tour controls data; and g) a software module initializing a resize listener for the viewport, wherein the resize listener, upon resize of the viewport, removes and re-draws the mask element and the SVG clip element for the current navigation step by re-executing steps b)-e) without refreshing the viewport environment.

12. The system of claim 11, wherein the computer storage is a local file.

13. The system of claim 11, wherein the computer storage is a local database.

14. The system of claim 11, wherein the computer storage is an external database.

15. The system of claim 11, wherein the configuration data comprises an array of spotlight tour objects and navigation steps.

16. The system of claim 11, wherein the viewport is a browser window.

17. The system of claim 11, wherein the viewport is a mobile native interface.

18. The system of claim 11, wherein each navigation step is further associated with tour copy and wherein the spotlight tour application further comprises a software module positioning the tour copy based on offset coordinates calculated from the spotlight tour object.

19. The system of claim 11, wherein the system further comprises a software module instantiating, in a memory of the computer, the mask element comprising the SVG rect element at the full size of the viewport.

20. The system of claim 11, wherein the system further comprises a software module re-executing steps b)-d) for each of the plurality of spotlight tour navigation steps.

21. Non-transitory computer-readable storage media encoded with a computer program including instructions executable by a processor to create a spotlight tour application comprising:

a) configuration data, in an computer storage, for the spotlight tour, the configuration data comprising a plurality of spotlight tour navigation steps, each navigation step associated with a spotlight tour object, a shape property, and tour controls data;

b) a software module defining, by a computer, a mask element comprising an Scalable Vector Graphics (SVG) rect element with a fill color of white based on a current viewport size;

c) a software module drawing an SVG clip element with a fill color of black for the current navigation step based on the current viewport size, the shape property, and offset coordinates calculated from the spotlight tour object;

d) a software module appending the SVG clip element to the mask element, wherein the SVG clip element is rendered as a transparent region in the mask by alpha blending compositing to create a spotlight effect over the spotlight tour object;

e) a software module rendering tour controls for the navigation step based on the viewport size;

f) a software module positioning the tour controls based on offset coordinates calculated from the tour controls data; and g) a software module initializing a resize listener for the viewport, wherein the resize listener, upon resize of the viewport, removes and re-draws the mask element and the SVG clip element for the current navigation step by re-executing steps b)-e) without refreshing the viewport environment.

22. The media of claim 21, wherein the computer storage is a local file.

23. The media of claim 21, wherein the computer storage is a local database.

24. The media of claim 21, wherein the computer storage is an external database.

25. The media of claim 21, wherein the configuration data comprises an array of spotlight tour objects and navigation steps.

26. The media of claim 21, wherein the viewport is a browser window.

27. The media of claim 21, wherein the viewport is a mobile native interface.

28. The media of claim 21, wherein each navigation step is further associated with tour copy and wherein the spotlight tour application further comprises a software module positioning the tour copy based on offset coordinates calculated from the spotlight tour object.

29. The media of claim 21, wherein the media further comprises a software module instantiating, in a memory of the computer, the mask element comprising the SVG rect element at the full size of the viewport.

30. The media of claim 21, wherein the media further comprises a software module re-executing steps b)-d) for each of the plurality of spotlight tour navigation steps.

* * * * *